United States Patent [19]

Fahrig et al.

[11] 4,364,905

[45] Dec. 21, 1982

[54] FLUID CATALYTIC CRACKING APPARATUS HAVING RISER REACTOR AND IMPROVED MEANS ASSOCIATED WITH THE RISER REACTOR FOR SEPARATING CRACKED PRODUCT AND ENTRAINED PARTICULATE CATALYST

[75] Inventors: Robert J. Fahrig, Lansing; Lansing M. Hinrichs, Chicago, both of Ill.

[73] Assignee: Standard Oil Company (Indiana), Chicago, Ill.

[21] Appl. No.: 235,999

[22] Filed: Feb. 19, 1981

Related U.S. Application Data

[62] Division of Ser. No. 96,939, Nov. 23, 1979, Pat. No. 4,295,961.

[51] Int. Cl.$^3$ .................. B01J 8/18; B01D 45/12; B04C 5/26; B04C 5/28
[52] U.S. Cl. ............................ 422/144; 422/147; 422/223; 55/343; 55/349; 208/161; 209/144
[58] Field of Search ............... 422/144, 145, 147, 223; 208/161; 55/343, 349; 209/144

[56] References Cited

U.S. PATENT DOCUMENTS

| | | | |
|---|---|---|---|
| 2,337,684 | 12/1943 | Scheineman | 422/144 |
| 2,816,011 | 12/1957 | Trainer et al. | 422/144 |
| 3,243,265 | 3/1966 | Annesser | 422/214 |
| 3,690,841 | 9/1972 | Bunn, Jr. et al. | 422/144 |
| 3,841,843 | 10/1974 | Williams et al. | 422/144 |
| 3,957,443 | 5/1976 | Strickland et al. | 422/145 |
| 4,070,159 | 1/1978 | Myers et al. | 422/147 |
| 4,219,407 | 8/1980 | Haddad et al. | 208/161 |

FOREIGN PATENT DOCUMENTS 74256 3/1954 Netherlands ................ 209/144

Primary Examiner—David L. Lacey
Attorney, Agent, or Firm—Lansing M. Hinrichs; William T. McClain; William H. Magidson

[57] ABSTRACT

An apparatus for the fluid catalytic cracking of hydrocarbons having a riser reactor with structure at its lower end for introduction of hydrocarbon feedstock and particulate catalyst and having its upper end opening into a separator vessel. A flow reversal structure attached to a downwardly directed flow reversal conduit is provided at the upper end of the riser and within the separator vessel. The flow reversal structure and conduit serve to direct cracked hydrocarbon products and particulate catalyst downwardly toward a stripper located at the bottom of the separator vessel. Cyclones having gas inlet ducts in communication through the wall of the flow reversal conduit are provided. The cyclones are connected to vent cracked hydrocarbon products outside of the separator vessel.

4 Claims, 4 Drawing Figures

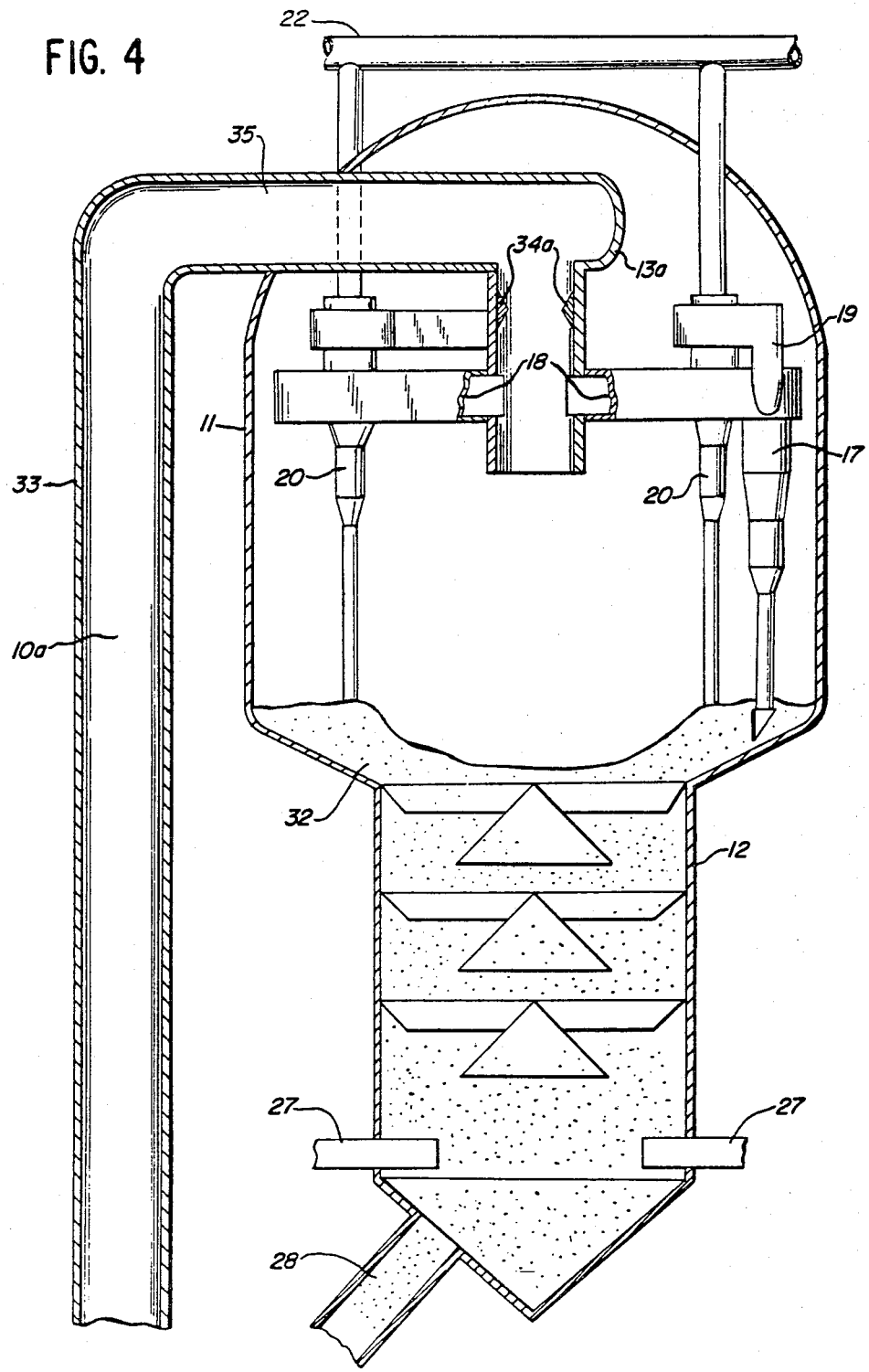

4,364,905

FLUID CATALYTIC CRACKING APPARATUS HAVING RISER REACTOR AND IMPROVED MEANS ASSOCIATED WITH THE RISER REACTOR FOR SEPARATING CRACKED PRODUCT AND ENTRAINED PARTICULATE CATALYST

This is a division, of application Ser. No. 96,939, filed Nov. 23, 1979, now U.S. Pat. No. 4,295,961.

BACKGROUND OF THE INVENTION

1. Field of the Invention

The field of art to which this invention pertains is hydrocarbon processing in which a fluidized particulate catalyst is employed to effect desired reactions. More specifically this invention relates to an improved apparatus and method especially suited for carrying out fluid catalytic cracking of hydrocarbon feedstocks in such manner as to maximize the production of valuable liquid products while minimizing the production of coke and less valuable vapor products particularly the $C_2$ and lighter products.

In modern fluid catalytic cracking units the cracking reaction can be effected by introducing the hydrocarbon feedstock at the lower end of riser reactor pipe or conduit together with hot fluidized catalyst which supplies all or a major proportion of the heat to vaporize the feedstock and carry out the endothermic reaction. The vaporized feedstock and catalyst pass up the riser reactor together at a high velocity and the cracking reaction is largely complete at the top of the riser reactor. The effluent gases and catalyst enter a separator vessel where the catalyst drops to the bottom into a steam stripping zone where minor amounts of hydrocarbon associated with the catalyst particulates are stripped off. The bulk of the cracked hydrocarbons separate from the catalyst in the separator vessel and are passed out of the separator vessel through cyclones in one or more stages which separate entrained catalyst particulates. These particulates pass downwardly through the cyclone dip legs to the bottom of the separator vessel and into a steam stripper. The stripped catalyst which is covered by a deposit of coke remaining from the cracking reaction is conveyed from the stripper through a transfer line to a regenerator vessel where the coke is burned off with air or other oxygen containing regeneration gas, the heat of combustion raising the temperature of the regenerated catalyst to a level sufficiently high to provide all or a major proportion of the heat for vaporization and reaction of the hydrocarbon feed when the regenerated catalyst is conveyed from the regenerator to the inlet end of the riser reactor.

The cracking reaction is difficult to control and if the feedstock is over-cracked, valuable liquid products such as gasoline and fuel oil will be broken down into less valuable normally vapor hydrocarbons such as $C_2$ and lighter products and excess coke. Moreover, when higher boiling feedstocks such as residual oils or heavy vacuum gas oils are cracked, higher temperatures and contact times are required to crack the principal components and undesired over cracking and coking are prone to occur particularly if the hot cracked products remain in contact with the hot catalyst after the principal desired reactions have occurred.

2. Prior Art

A number of conventional fluid catalytic cracking units are schematically illustrated and described on pages 113 through 120 inclusive in the September 1976 issue of Hydrocarbon Processing. The units shown on pages 114–117 have vertical riser pipes or transfer lines which extend into vessels which serve as reactors or separators or both. In the units shown on pages 118 and 119 the use of a rough cut cyclone at the upper end of the riser reactor to effect a primary disengagement or separation of the catalyst from the cracked product is disclosed. The cracket products are not conducted out of the vessel directly from this cyclone but pass into the vapor zone of the separator vessel before exiting through a second stage cyclone. U.S. Pat. No. 4,088,568, A. B. C. Schwartz, discloses the use of rough cut cyclone in which the gaseous effluent stream is conducted to a plenum.

U.S. Pat. Nos. 4,066,533 and 4,070,159 to G. D. Myers et al., disclose rough cut cyclones directly connected to the upper extremity of a riser the top of which is open into the separator vessel. With this arrangement up flowing catalyst is carried by inertial momentum into the vessel while vapor products pass laterally into the cyclones and exit the vessel. The out flowing catalyst from the riser passes to the top of the vessel, hits a conical deflector plate which directs it radially to the sides of the vessel and finally drops by gravity to the bottom of the vessel.

The following U.S. Patents disclose the use of various kinds of flow reversal means for directing the flow of the vapors and catalyst downwardly in annular relation to the riser toward a dense catalyst bed maintained at the bottom of the vessel:

U.S. Pat. Nos. 3,841,843 D. P. Williams et al.; 3,243,265 R. J. Annesser; 3,959,117 Bunn Jr. et al.; 4,035,284 B. Gross et al.

SUMMARY OF THE INVENTION

The present invention relates to an improved method and apparatus for effecting riser cracking to an optimum degree wherein over cracking and excessive coke formation can be held to a minimum. The invention is further characterized by a novel method and apparatus for effecting rapid disengagement of the cracking catalyst particulates and the products of the cracking reaction utilizing inertial and gravitational forces on the moving catalyst and thereby preventing unwanted reactions from occurring and increasing the yield of desired liquid products. Another feature of this invention is that an arrangement is provided whereby the bulk of the catalyst is transported with both inertial and gravitational assistance immediately following disengagement from the cracked products into the inert gas stripper whereby hydrocarbons adhering to the catalyst can be stripped therefrom almost instantaneously.

The method of this invention can be briefly described as a method for the fluid catalytic cracking of hydrocarbon feedstocks wherein an ascending cocurrent stream of vaporous hydrocarbons and entrained catalyst particulates whose upward flow is at a rate substantially less than the flow rate of said hydrocarbons is effected in an elongated tubular reaction zone, the improvement which comprises (1) altering the direction of flow of said stream of hydrocarbons and catalyst particulates to a downward direction by conducting said stream into a flow reversal means which discharges into a downwardly directed flow reversal conduit, (2) accelerating the rate of downward flow of said catalyst particulates by gravitational force augmenting fluid flow drag forces to impart momentum thereto, (3) withdrawing cracked hydrocarbon products laterally from the downwardly flowing catalyst particulates, and (4) contacting the downwardly flowing catalyst particulates with an ascending flow of inert stripping gas after substantial withdrawal of the cracked hydrocarbon products, the momentum of said particulates preventing their passage laterally with the cracked hydrocarbons and permitting their passage counter-current to the upward movement of the inert stripping gas.

The apparatus of this invention comprises the combination of a vertically ascending riser reactor having means at its lower end for introduction of hydrocarbon feedstock and particulate catalyst, flow reversal means and attached downwardly directed flow reversal conduit at the upper end of said riser reactor for directing the flow of cracked hydrocarbon product and entrained particulate catalyst downwardly into a separator vessel, a steam stripper located at the bottom of said vessel, and cyclone separator means having an opening laterally communicating with the interior of said flow reversal conduit and connected to vent said cracked hydrocarbon products outside of the separator vessel.

BRIEF DESCRIPTION OF THE DRAWINGS

FIG. 4 is a sectional view of a modified embodiment of this invention particularly suited for units having external riser reactors.

DESCRIPTION OF THE PREFERRED EMBODIMENT

The method and apparatus of this invention may be adapted for other processes involving fluidized catalyst but they have maximum utility when utilized in the fluid catalytic cracking of hydrocarbon feedstock.

Figure 1:
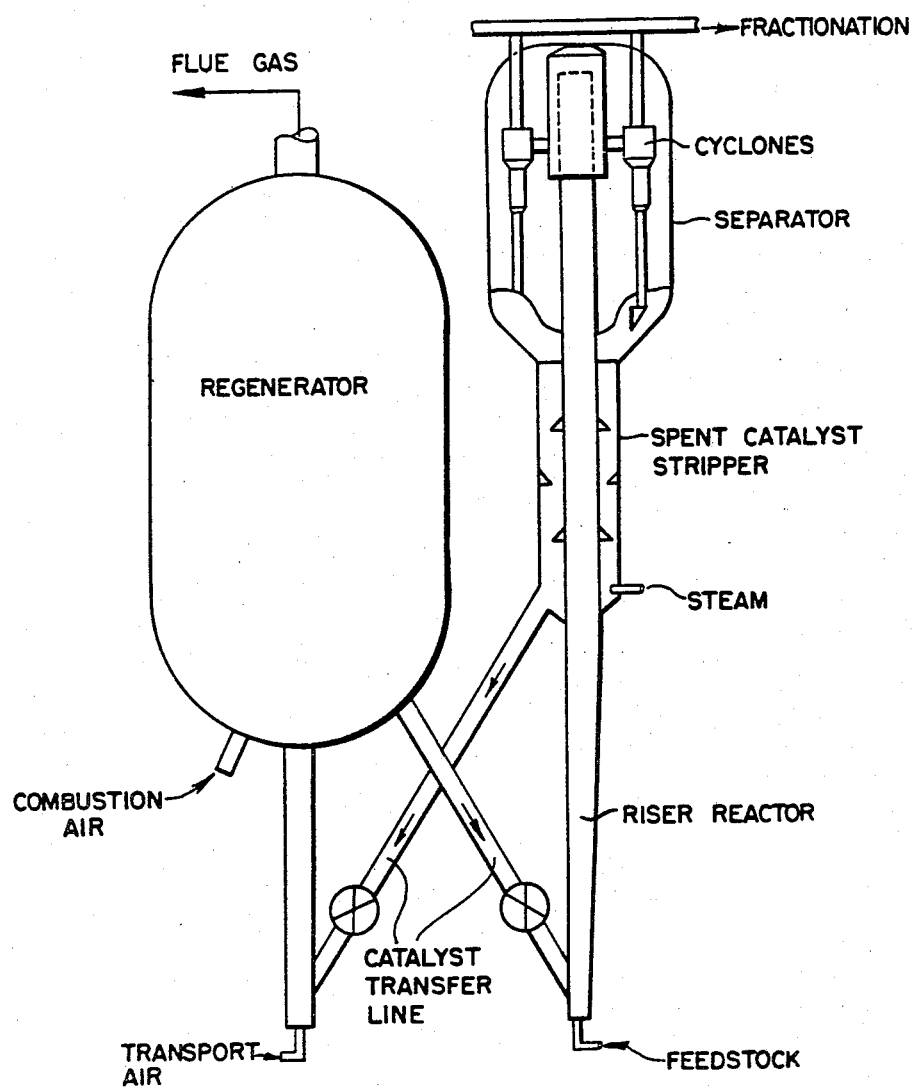
FIG. 1 is a diagrammatic elevational view of a fluid catalytic cracking unit incorporating the riser cracker and cyclone configuration of an embodiment of this invention.

In FIG. 1 of the drawing there is illustrated a fluid catalytic cracking unit incorporating the features of this invention. The hydrocarbon feedstock in liquid phase, which may or may not be preheated, is introduced into the unit at the point indicated at the lower end of the vertical riser reactor where it is mixed with hot granular fluidized catalyst particulates (625° C.–750° C.) coming from the catalyst regenerator through the catalyst transfer line. The hot catalyst particulates vaporize the feedstock and the vapor together with entrained catalyst particulates proceeds up the riser and into the separator vessel. During passage through the riser the catalytic cracking of the feedstock to the desired degree (typically 60–80% conversion) occurs and is substantially complete at the upper end of the riser.

In the separator vessel the catalyst particulates and the cracked hydrocarbon vapors are separated, the vapors passing through cyclones and out of the vessel to a fractionator (not shown) and the catalyst particulates passing into the spent catalyst stripper at the bottom of the vessel where they are contacted by stripping steam or other inert stripping gas to remove hydrocarbons. From the bottom of the stripper the spent catalyst particulates which are coked with the nonvolatile products of the hydrocarbon cracking reaction pass through a second transfer line to the regenerator. In the regenerator combustion air burns the coke off the catalyst particulates which are maintained in a fluidized bed, reactivating the catalyst and heating it to a sufficiently high temperature to provide at least a portion of the heat of vaporization and reaction of the feedstock. The regenerated catalyst passes through the catalyst transfer line from the regenerator to the inlet end of the riser. Flue gas from the top of the regenerator can be passed to heat and power recovery units (not shown) before being exhausted to the atmosphere.

The present invention is directed to an arrangement of apparatus within the separator vessel and the resulting method of operation whereby higher yields of the desired liquid products are achieved than with conventional units. The invention can best be understood by reference to FIGS. 2 and 3 of the drawings. The vertical riser reactor 10 enters the separator vessel 11 through the spent catalyst stripper 12 and extends to a point near the top of vessel 11. A cylinder 13 whose upper end is closed by a cap 14 is suspended from the top of the vessel 11 in coaxial overlapping or telescoping relationship with the riser 10, the two together constituting a flow reversal means which discharges into a downwardly directed flow reversal conduit whose lower end 16 opens into the vessel 11. A plurality of primary cyclones 17 are disposed about the flow reversal conduit 13 with their inlets 18 opening into the annular passageway 15 through the wall of conduit 13. The vapor outlets 19 of the primary cyclones 17 are connected to secondary cyclones 20 and the vapor outlets 21 of the secondary cyclones 20 pass out of the vessel 11 through the top and are connected to header 22 which is in turn connected to conventional fractionation equipment (not shown). In the event secondary cyclones are not employed the vapor outlets of the primary cyclones exit through the top of the vessel 11 and interconnect with the header 22. Such an arrangement is illustrated in FIG. 1.

The stripper 12 located at the bottom of the separator vessel 11 comprises a plurality of frustroconical baffles 25 attached to the riser 10 and interspersed frustroconical baffles 26 attached to the side wall of stripper 12. Stripping steam or inert gas is introduced into the stripping zone 12 through nozzles 27. Stripped catalyst is conducted out of the stripping zone through catalyst transfer line 28.

All of the cyclones have dip legs 30 which extend downwardly to points near the bottom of the separator vessel 11. The dip legs 30 are preferably provided with flapper valves 31 at their lower ends which open to permit the flow of the small amount of catalyst separated in the cyclones into the bed of catalyst 32 which extends into the stripper 12.

Because of the highly abrasive nature of cracking catalyst particulates moving at high velocity it is preferred to line the riser reactor 10, the cylinder 13 and cap 14 with abrasion resistant refractory indicated at 33. In a preferred embodiment at a point 34 somewhat above the ports 18 to which the first stage cyclones 17 are connected, the refractory is built up to provide a venturi-like restriction or throat and reduce the flow area of the annular passageway 15. The purpose of this restriction is to increase the velocity of the flowing vapors to accelerate the entrained catalyst particulates upstream of the ports 18.

For a unit having a feed rate of 1,200,000 metric tons per year (approximately 25,000 barrels per stream day) the following are typical dimensions. The riser reactor is 25 meters in height, the bottom portion tapering from a diameter at the bottom inlet end of 0.85 meter to a diameter of 1.0 meter at an elevation of about ten meters. The upper 15 meter section is not tapered. The internal diameter of the cylinder enclosing the upper end of the riser reactor is 1.75 meters and it extends downwardly approximately five meters below the upper part of the cap 14. The internal diameter of the cylinder at the venturi throat is 1.5 meters. The distance from the top of the riser reactor to the top of the cap is one meter. The stripper 12 is 3 meters in diameter and 6 meters in height. The vessel 11 is 5 meters in diameter and readily encloses four primary and four secondary cyclones. In practice the cyclones can be located outside of the vessel but problems of thermal expansion and contraction and leaks which may develop are minimized by mounting the cyclones within the vessel. By hanging the assembly of cyclones and the flow reverser all from the top of the vessel and frabricating them from the same material of construction expansion and contraction problems are minimized since the cyclones and the cylinder will be at the same temperature even during upsets in operation which may occur.

METHOD OF OPERATION

Figure 2:
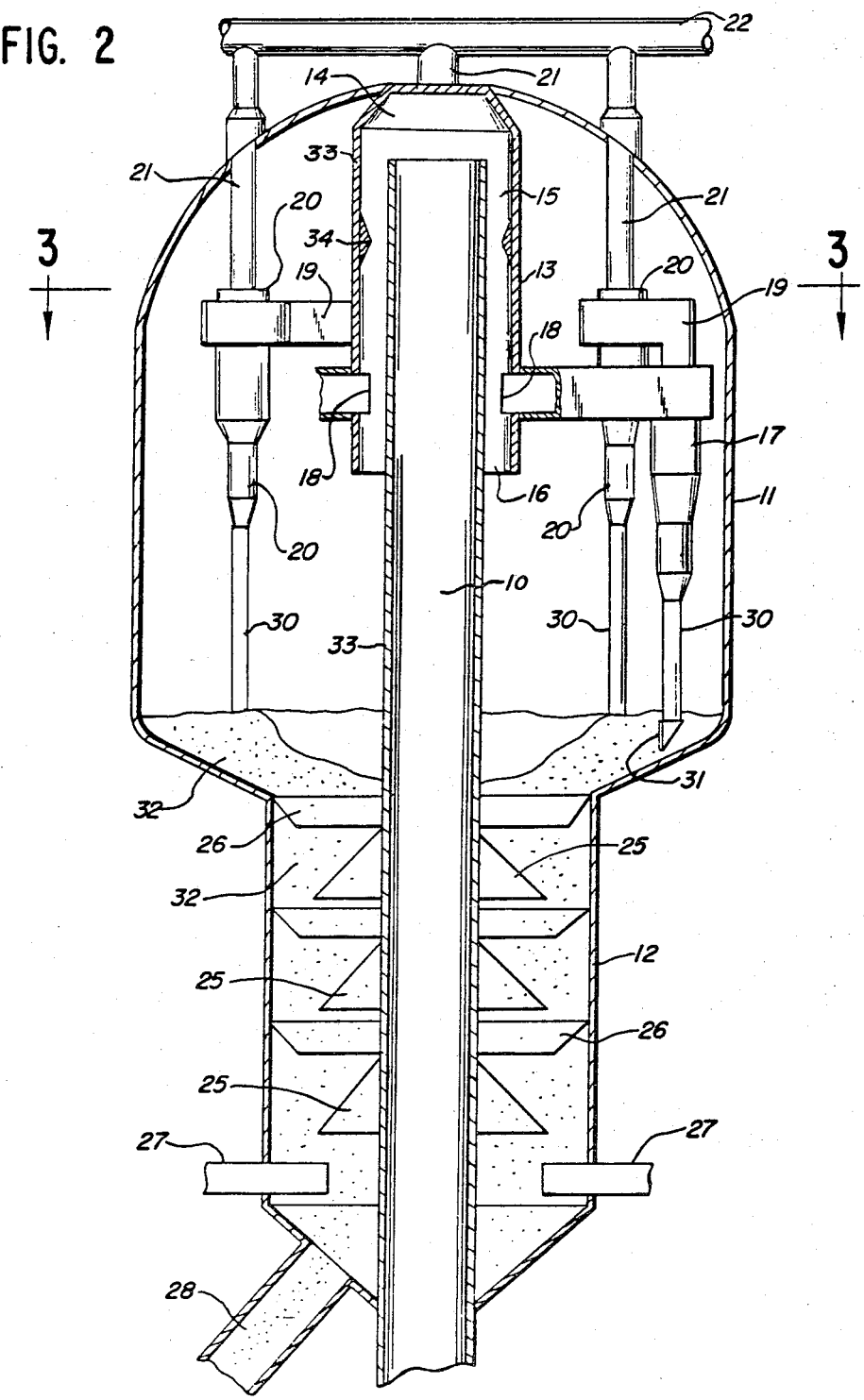
FIG. 2 is a sectional view showing the preferred riser cracker and cyclone configuration of this invention.
Figure 3:
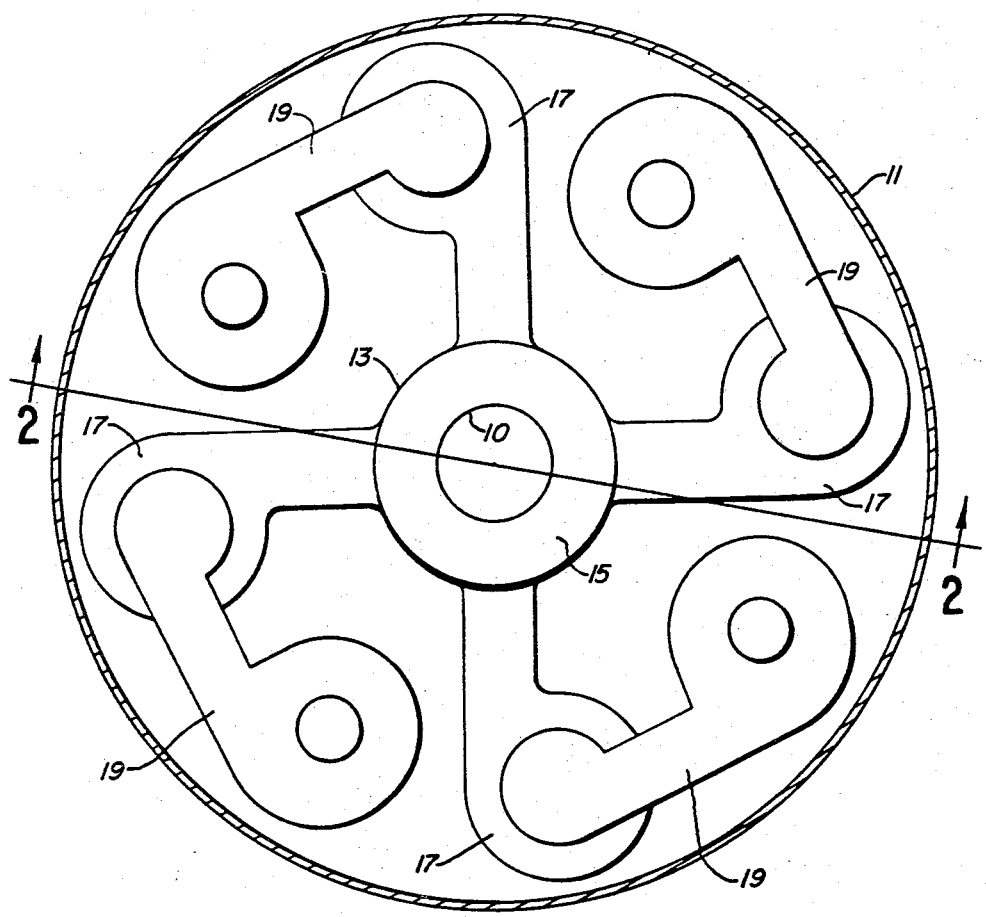
FIG. 3 is a sectional view taken on line 3—3 of FIG. 2.

The process of this invention may best be described by reference to the manner in which it may be carried out in the preferred embodiment of the apparatus shown in the FIGS. 1–3 of the drawings. Hot regenerated catalyst particulates preferably having a size of not greater than about 100 microns with a major proportion thereof in the range of from about 40 to 80 microns and at a temperature of between about 625° to 750° C. enter the riser reactor 10 at the bottom through the catalyst transfer line. Suitable hydrocarbon cracking catalysts for use in the practice of this invention include all high-activity solid catalysts which are stable under the required conditions. Suitable catalysts include those of the amorphous silica-alumina type having an alumina content of about 10 to about 30 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite-type cracking catalysts are preferred because of their thermal stability and high catalytic activity.

Suitable hydrocarbon feedstocks for use in a fluidized catalytic cracking process in accordance with this invention include, but are not limited to, petroleum fractions such as light gas oils, heavy gas oils, wide-cut gas oils, vacuum gas oils, naphthas, decanted oils, residual fractions and cycle oils derived from any of these as well as hydrocarbon fractions derived from shale oils, tar sands processing, synthetic oils, coal liquefaction and the like. Any of these suitable feedstocks can be employed either singly or in any desired combination.

The hydrocarbon feedstock to be cracked is also supplied to the riser reactor at its lower end through nozzles. Vaporization and cracking of the feedstock begins immediately and the vaporous hydrocarbons proceeds up the riser together with entrained catalyst particulates, the upward motion of the particulates being induced by the fluid flow drag exerted thereon. Because of the inertial and gravitational forces, the linear velocity of the particulates is less than that of the hydrocarbons, typically being about one third to one half the hydrocarbon velocity and being relatively higher at the upper end of the riser. At the top of the riser the hydrocarbon velocity can be in the range of three to thirty meters per second and the catalyst velocity can be between about one to twenty-five meters per second. Typical values are about ten meters per second hydrocarbon velocity and about six meters per second catalyst velocity at the upper end of the riser.

From the open end of the riser 10 the hydrocarbon vapors which have been cracked to the desired degree during passage up the riser enter the flow reverser 13 and pass downwardly through the annular space 15. The entrained catalyst particulates are carried with the hydrocarbons vapors and may impinge upon the surfaces of the cap 14 in essentially elastic collision. In practice the lower surface of the cap 14 is protected from erosion by the use of a refractory lining and the accumulation of a static layer of particulate catalyst thereunder upon which the particulates impinge.

As the hydrocarbon vapors and catalyst particulates begin passage downwardly through the space 15 the gravitational force rather than opposing the fluid flow drag force augments this force, the resulting acceleration (980 cm/sec$^2$) substantially increasing the inertial momentum of the catalyst particulates. In the preferred embodiment of the apparatus the cross sectional area of the annular space 15 is approximately equal to the cross sectional area of the riser 10 whereby the linear velocity of the hydrocarbon vapors is substantially the same as that at the upper end of the riser. In cases where it is desired to increase the fluid flow drag force the venturi like projection indicated at 34 can be provided at any desired elevation within the flow reservoir 13 and above the cyclone inlets 18. Placed close to the inlets the projection 34 can also serve as diverter to deflect catalyst particulates inwardly away from these inlets.

The increment of velocity increase induced by gravitational force is a function of the residence time of the catalyst particulates within the annular space 15. If free fall were to occur as would be the case if there were no fluid flow drag effect, the particulates would require approximately one second to fall the five meter distance from the top of the flow reverser 13 to its lower extremity and their exit velocity would be approximately ten meters per second. This velocity is substantially in excess of the typical catalyst velocity at the top of a riser (6 meters/sec.) described above and represents a minimum value for the exit velocity of the catalyst particulates from flow reverser because the fluid flow drag effect induced velocity increment is additive to the gravity induced increment.

When the downwardly flowing stream of hydrocarbon vapors and entrained catalyst particulates reaches the cyclone inlets 18 the hydrocarbon vapors pass laterally from the annular space 15 and into the primary cyclones 17. All but a small portion of catalyst particulates, however, having high momentum continue downwardly at high velocity out the opening 16 and into the stripper 12. Stripping steam is introduced through the nozzles 27 near the bottom of the stripper at a rate of between about 3 and 10 percent (preferably 5%) of the volume of the hydrocarbon products exiting through the cyclones 17. The stripping steam strips hydrocarbons from the catalyst particulates and together with the stripped hydrocarbons exits from the vessel 11 through the opening 16 at the bottom of the flow reverser 13 and through the cyclone inlets 18. Because the volume of this steam flow upward through the opening 16 is very small compared with the total hydrocarbon vapor flow, the momentum of the catalyst particulates is sufficiently high to carry them rapidly through the exiting stripping steam and directly into the top of the stripper 12. Thus stripping of the particulates is initiated immediately following their substantial separation from the hydrocarbon vapors. This is especially important, since any prolonged contact results in additional coke formation and over cracking to produce undesired light ends, thus reducing the yield of valuable products. From the bottom of stripper 12 the spent catalyst is conveyed to the regenerator by transfer line 28. In the regenerator the coke is burned off and the catalyst is reactivated for recirculation to the riser reactor 10.

Because of their high momentum a relatively very small amount of catalyst particulates enters the primary cyclones 17 and even less passes to the secondary cyclones 20. The primary and secondary cyclones perform in the usual manner and deliver the separated particulates to the bottom of the vessel 11 through dip legs 30 from which point the particulates are free to slide into the stripper 12. In many cases secondary cyclones will not be necessary because effective separation can be effected in the first stage cyclones. The spatial arrangement of the preferred embodiment of the apparatus makes the inclusion of secondary cyclones very convenient and their use can eliminate the need for decanting apparatus for the condensed effluent product.

The specific dimensions and structural arrangements set forth are intended to be illustrative of a preferred mode of carrying out the invention and they may be varied or adapted to specific situation which may be encountered. For example in designing a revamp of an existing fluid catalytic cracker it was found that an external riser located outside of the separator vessel had to be utilized and that the telescoping relationship between the upper end of the riser and the flow reverser could not be used. Instead of accomplish the desired reversal to down flow, the revamp design shown in FIG. 4 of the drawings utilizes a downwardly extending flow reverser conduit 13a open at the bottom and mounted within the vessel 11. The flow reverser conduit is connected to the top of the external riser 10a by a cross-over pipe 35 which serves as the flow reverser means. The cyclones 20 are disposed around the flow reverser conduit 13a and interconnected therewith in the same manner as the cyclones and flow reverser conduit are shown in FIGS. 2 and 3.

Other changes and modifications which are within the spirit and scope of the present invention will be obvious to those skilled in the art. Therefore, no limitation upon the improved method and apparatus of the present invention whose scope is defined by the following claims is to be implied.

We claim:

1. In an apparatus for fluidized catalytic cracking of hydrocarbon feedstocks, the improvement comprising the combination of an ascending riser reactor having its upper end opening into a separator vessel and means at its lower end for introduction of hydrocarbon feedstock and particulate catalyst, flow reversal means at the upper end of said riser reactor and an attached downwardly directed flow reversal conduit the lower end of which opens into said separator vessel for directing the flow of cracked hydrocarbon product and entrained particulate catalyst downwardly toward said separator vessel, a catalyst stripper located at the bottom of said vessel, and cyclone separator means having gas inlet duct means which are in communication through the wall of said flow reversal conduit with the interior thereof, said cyclone separator means being connected to said separator vessel so as to vent said cracked hydrocarbon products outside of said separator vessel.

2. An apparatus in accordance with claim 1 in which the flow reversal conduit surrounds the upper end of the riser reactor in overlapping coaxial relationship.

3. An apparatus in accordance with claim 2 wherein each of said inlet duct means has an inlet which is in direct communication with the annular space defined by the upper end of the riser reactor and the wall of the flow reversal means near the lower end thereof.

4. An apparatus in accordance with claim 3 in which a venturi-like projection is provided within the annular space above the cyclone inlets in order to accelerate the rate of downward flow of hydrocarbon products and entrained catalyst particulates.

* * * * *

UNITED STATES PATENT OFFICE
CERTIFICATE OF CORRECTION

Patent No. 4,364,905          Dated DECEMBER 21, 1982

Inventor(s) FAHRIG, ROBERT J. and HINRICHS, LANSING M.

It is certified that error appears in the above-identified patent and that said Letters Patent are hereby corrected as shown below:

Column 2, line 15, "A.B.C. Schwartz" should be --A.B.S. Schwartz--.

Column 2, lines 15-16, "rough cut" should be --a rough cut--.

Column 6, line 18, "hydrocarbons" should be --hydrocarbon--.

Column 6, line 37, "reservoir" should be --reverser--.

Column 7, line 42, "Instead of" should be --Instead to--.

Signed and Sealed this

Twenty-first Day of June 1983

[SEAL]

Attest:

DONALD J. QUIGG

Attesting Officer      Acting Commissioner of Patents and Trademarks